US009767487B2

(12) United States Patent
Schechter et al.

(10) Patent No.: US 9,767,487 B2
(45) Date of Patent: Sep. 19, 2017

(54) TARGETING ADVERTISEMENTS TO CUSTOMIZED GROUPS OF USERS OF AN ONLINE SYSTEM

(71) Applicant: Facebook, Inc., Menlo Park, CA (US)

(72) Inventors: Greg Schechter, Seattle, WA (US); Benjamin Golub, San Francisco, CA (US); Vladimir Fedorov, Menlo Park, CA (US); Jason Scott Sobel, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 751 days.

(21) Appl. No.: 14/034,350

(22) Filed: Sep. 23, 2013

(65) Prior Publication Data

US 2015/0088663 A1     Mar. 26, 2015

(51) Int. Cl.
*G06Q 30/02*     (2012.01)

(52) U.S. Cl.
CPC ................. *G06Q 30/0271* (2013.01)

(58) Field of Classification Search
CPC ................................. G06Q 30/0271
See application file for complete search history.

(56) References Cited

U.S. PATENT DOCUMENTS 6,965,870 B1 * 11/2005 Petras ............... G06Q 30/02
                                                                  705/14.54
8,666,812 B1 *  3/2014 Gandhi .............. G06Q 30/02
                                                                  705/14.52
8,799,053 B1 *  8/2014 Goldberg .......... G06F 21/6254
                                                                  705/7.29

(Continued)

FOREIGN PATENT DOCUMENTS

JP    2005-267514 A    9/2005
JP    2010-117794 A    5/2010

(Continued)

OTHER PUBLICATIONS

PCT International Search Report and Written Opinion, PCT Application No. PCT/US2014/056387, Dec. 22, 2014, twelve pages.

(Continued)

*Primary Examiner* — Jacob C. Coppola
(74) *Attorney, Agent, or Firm* — Fenwick & West LLP (57) ABSTRACT

An online system enables developers of third-party applications to specify online system users to receive advertisements. The online system generates and sends a user-specific identifier for online system users that use a third-party application when an advertiser associated with the third-party application requests a user-specific identifier from the online system. For example, the online system retrieves user identifying information associated with a client device identifier provided by an advertiser and generates a user identifier by encrypting the retrieved user identifying information. The advertiser may include one or more user-specific identifiers in an advertisement request sent to an online system to present an advertisement in the advertisement request to online system users corresponding to the user-specific identifiers. The online system determines whether to present the advertisement to users based in part on whether users correspond to user-specific identifiers included in the advertisement request.

16 Claims, 2 Drawing Sheets

(56) References Cited

U.S. PATENT DOCUMENTS

| | | | | |
|---|---|---|---|---|
| 2001/0020242 A1* | 9/2001 | Gupta | G06Q 30/02 | 715/210 |
| 2004/0215509 A1* | 10/2004 | Perry | G06Q 30/02 | 705/14.55 |
| 2006/0047571 A1 | 3/2006 | Garcia et al. | | |
| 2006/0282328 A1* | 12/2006 | Gerace | G06F 17/30867 | 705/14.66 |
| 2009/0070219 A1* | 3/2009 | D'Angelo | G06Q 10/10 | 705/14.56 |
| 2009/0234708 A1* | 9/2009 | Heiser, II | G06Q 30/02 | 705/14.17 |
| 2009/0234715 A1* | 9/2009 | Heiser, II | G06F 17/30867 | 705/14.17 |
| 2010/0070872 A1* | 3/2010 | Trujillo | G06F 3/04892 | 715/745 |
| 2010/0280874 A1* | 11/2010 | Thorn | G06Q 30/00 | 705/14.64 |
| 2011/0082824 A1* | 4/2011 | Allison | G06N 99/005 | 705/7.11 |
| 2011/0093346 A1* | 4/2011 | Lunt | G06F 17/30864 | 705/14.71 |
| 2011/0167003 A1* | 7/2011 | Nice | G06Q 30/0271 | 705/50 |
| 2011/0231240 A1* | 9/2011 | Schoen | G06Q 30/0242 | 705/14.41 |
| 2012/0066084 A1* | 3/2012 | Sneyders | G06Q 30/02 | 705/26.1 |
| 2012/0166532 A1* | 6/2012 | Juan | G06Q 50/01 | 709/204 |
| 2012/0284746 A1* | 11/2012 | Evans | H04N 21/44204 | 725/34 |
| 2013/0080259 A1* | 3/2013 | Durvasula | G06Q 30/0246 | 705/14.66 |
| 2013/0124628 A1* | 5/2013 | Weerasinghe | G06Q 50/01 | 709/204 |
| 2013/0246173 A1* | 9/2013 | Berkley | G06Q 30/02 | 705/14.53 |
| 2014/0019261 A1* | 1/2014 | Hegeman | G06Q 30/02 | 705/14.71 |
| 2014/0136321 A1* | 5/2014 | Bolan | G06Q 30/0269 | 705/14.53 |
| 2014/0223462 A1* | 8/2014 | Aimone | H04N 21/42201 | 725/10 |
| 2014/0316853 A1* | 10/2014 | Lyren | G06Q 30/0202 | 705/7.31 |
| 2015/0379574 A1* | 12/2015 | Pattan | G06Q 30/0261 | 705/14.58 |

FOREIGN PATENT DOCUMENTS

| | | |
|---|---|---|
| JP | 2011-065214 A | 3/2011 |
| KR | 10-2007-0117881 A | 12/2007 |

OTHER PUBLICATIONS

Canadian Intellectual Property Office, Office Action, Canadian Patent Application No. 2,920,905, Feb. 6, 2017, three pages.

* cited by examiner

TARGETING ADVERTISEMENTS TO CUSTOMIZED GROUPS OF USERS OF AN ONLINE SYSTEM

BACKGROUND

This disclosure relates generally to online systems, and in particular to presentation of advertisements to users of an online system.

An online system allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by social networking systems, such as a social networking system, an online system provides an ideal forum for advertisers to increase awareness about products or services by presenting ads to online system users.

Presenting advertisements to users of an online system allows an advertiser to gain public attention for products or services and to persuade online system users to take an action regarding the advertiser's products, services, opinions, or causes. Many online systems generate revenue by displaying advertisements to their users. Frequently, online systems charge advertisers for each presentation of an advertisement to an online system user (i.e., each "impression" of the advertisement) or interaction with an advertisement by an online system user.

Advertisers, such as mobile application developers, may seek to present advertisements to online system users likely to be interested in an advertised product or service via the online system. For example, users of a game application who have reached a certain level in the game may be more likely to be interested in an advertisement about new levels added to the game than users that are unfamiliar with the game. Conventionally, to identify relevant advertisements for presentation to various users of an online system, developers of third-party applications collect data about their users and select advertisements for particular users based on the collected data. However, this method of advertisement selection requires third-party application developers or advertisers to access information maintained by an online system that associates the identities of third-party application users with users of the online system.

By allowing advertisers to access information that identifies online system users, an online system risks exposing a user's personal information to advertisers that are otherwise unable to access such information; information that online system users entrust to the online system. This potential exposure threatens an online system user's privacy. Because users often distrust companies that risk the privacy of their information, and because of laws that governing privacy of user information, online systems need to balance protection of user identifying information with allowing advertisers to leverage certain information to provide targeted advertisements.

SUMMARY

To enable advertisers, such as third-party application developers, to target advertisements for presentation to a group of online system users an online system provides encrypted information identifying individual users to an advertiser. By providing an advertiser with encrypted identification information, the online system protects information maintained by the online system related to its users. However, an advertiser may specify one or more online system users to receive advertisements while logged in to the online system or while the users' devices are otherwise able to receive advertisements from the online system using the encrypted identification information. This allows advertisers to target advertisements to various online system users without the online system providing the advertiser with private information about online system users.

In one embodiment, a third-party application developer or other advertisement sends a request to the online system to generate a user-specific application identifier (i.e., an application user ID) for each user of the third-party application. Based on a received request to generate an application identifier for a user, the online system retrieves a client device identifier (e.g., Identifier for Advertising) from a client device associated with the user. The client device identifier is information that uniquely identifies a client device, such as a combination of characters uniquely identifying a client device. In one embodiment, a native application associated with the online system installed on the user's client device (e.g., mobile device) communicates the client device identifier to the online system. Alternatively, the request for the online system to create the application user ID includes the client device identifier.

The online system retrieves user-identifying information associated with a client device based on a received client device identifier to identify an online system user associated with the client device. In one embodiment, the online system associates a phone number with a client device identifier and also associates user-identifying information with the phone number. The online system encrypts the user-identifying information associated with the received client device identifier to generate an application user ID, and transmits the application user ID to the advertiser, or third-party developer, from which the request was received. In various embodiments, the application user ID may be based on a user identifier associated with a user by the online system or may be based on other information used by the online system to uniquely identify a user.

Using application user IDs received from the online system, a third-party application developer or other advertiser determines one or more online users to be presented with an advertisement while accessing the online system or otherwise able to receive advertisements provided by the online system by specifying application user IDs received from the online system in an advertisement ("ad") request sent to the online system. The application user IDs specify online system users to be presented with an advertisement included in the ad request. Based at least in part on whether the users are identified by an application user ID included in the ad request, the online system identifies users to be presented with the advertisement included in the ad request. Online system users corresponding to an identified application user ID included in the ad request may be presented with the advertisement via a mobile device, a desktop device, or other suitable device.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
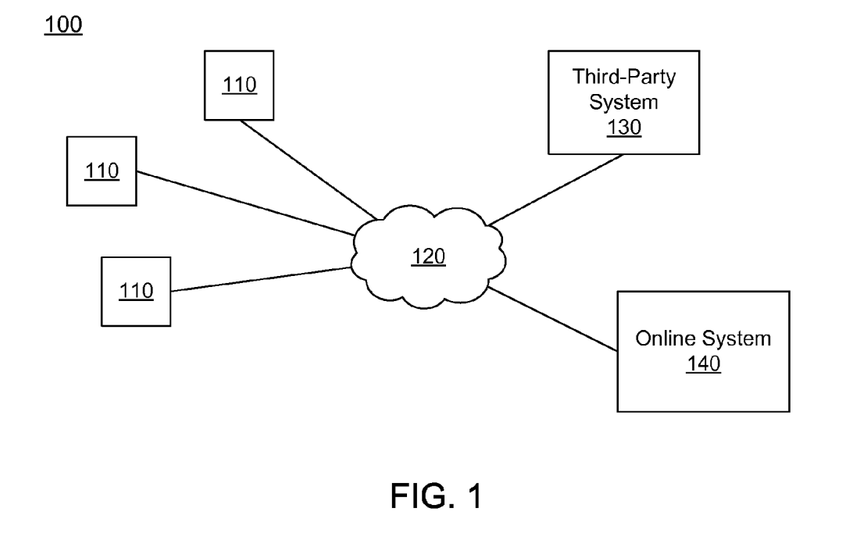
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. For example, the online system 140 is a social networking system. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
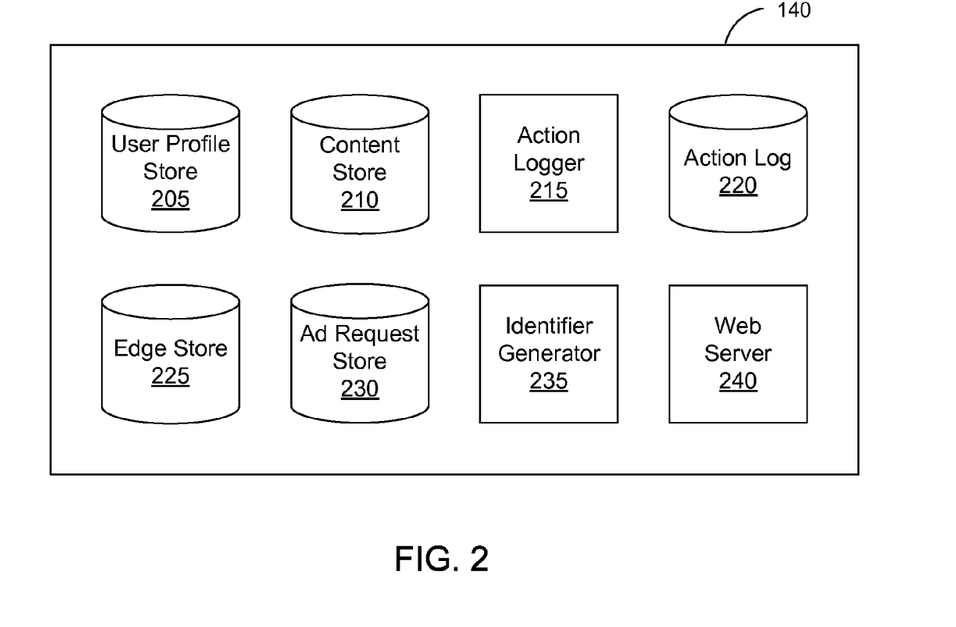
FIG. 2 is a block diagram of an online system, in accordance with an embodiment.

FIG. 2 is a block diagram of an architecture of the online system 140, which may be a social networking system in some embodiments. The online system 140 shown in FIG. 2 includes a user profile store 205, a content store 210, an action logger 215, an action log 220, an edge store 225, an ad request store 230, an identifier generator 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are stored in the ad request store 230. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the online system 140 if the advertisement is presented to a user or accessed by a user. In one embodiment, the bid amount is used by the online system to determine an expected value, such as monetary compensation, received by the online system 140 for presenting the advertisement to a user, if the advertisement receives a user interaction, or based on any other suitable condition. For example, the bid amount specifies a monetary amount that the online system 140 receives from the advertiser if the advertisement is displayed and the expected value is determined based on the bid amount and a probability of a user accessing the displayed advertisement.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. The targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The identifier generator 235 determines the identity of an online system user based on a received client device identifier. In one embodiment, the client device identifier is received from a native application associated with the online system 140 and executing on the client device 110. For example, the online system 140 associates a client device identifier with information identifying an online system user, such as a phone number, an email address, or other information capable of uniquely identifying different online system users. The online system 140 associates a user identifier of a user with the identifying information, so the identifying information is associated with both a client device identifier and a user identifier.

After determining information identifying an online system user associated with a client device identifier, the identifier generator 235 generates an application user ID by encrypting, or otherwise obfuscating, information identifying the online system user. The application user ID may be generated based on a request received by the online system 140. In one embodiment, a unique application user ID is generated for each request received by the online system 140 to create an application user ID, so a single user may be associated with multiple application user IDs. Alternatively, each user of the online system may be associated with a specific application user ID that is stored by the online system 140 and subsequently retrieved when a request for an application user ID is received.

Additionally, the identifier generator 235 identifies one or more online system users to receive an advertisement based on application user IDs specified in an ad request including the advertisement. For example, if an ad request specifies one or more application user IDs, the identifier generator 235 determines a user identifier associated with each of the application user IDs and presents an advertisement associated with the ad request to users corresponding to the determined user identifiers. Presentation of advertisements to users based on application user IDs is further described below in conjunction with FIG. 3.

The web server 240 links the online system 140 via the network 120 to the one or more client devices 110, as well as to the one or more third party systems 130. The web server 240 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS®, or BlackberryOS.

Presenting Advertisements to Customized Groups of Online System Users

Figure 3:
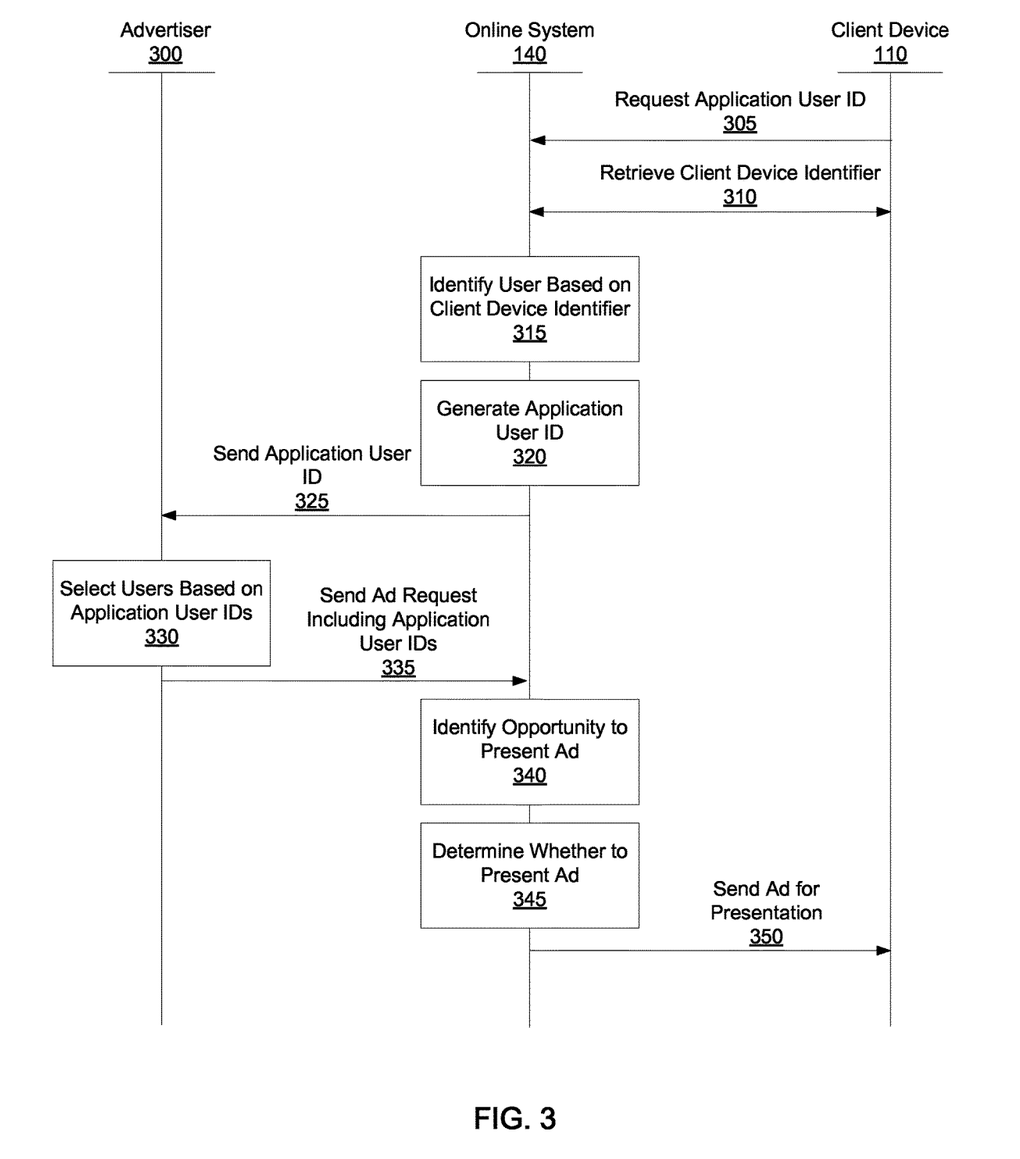
FIG. 3 is an interaction diagram of a method for presenting an advertisement to an online system user specified online system user, in accordance with an embodiment.

FIG. 3 is an interaction diagram of one embodiment of a method for targeting an advertisement to an online system user. In the example shown by FIG. 3, a third-party application executing on a client device 110 associated with the online system user requests 305 an application user ID from an online system 140. When the online system 140 receives the request, the online system 140 retrieves 310 a client device identifier associated with a client device 110 from which the request was received. In the example shown by FIG. 3, For example, the online system 140 retrieves 310 the client device identifier by communicating with the application executing on the client device 110 and associated with the online system 140. However, the online system 140 may retrieve 310 the client device identifier from the received request or from information stored by the online system 140. As described above in conjunction with FIG. 2, the client device identifier is information uniquely identifying a client device 110. A client device identifier may be, for example, a media access control (MAC) address, an international mobile station equipment identity (IMEI) number, a serial number, some other alphanumeric character string uniquely associated with a client device 110 (e.g., an Identifier for Advertising), etc.

Based on the retrieved client device identifier, the online system 140 identifies 315 an online system user associated with the client device identifier. In one embodiment, the online system 140 identifies 315 the online system user by retrieving user-identifying information stored by the online system 140 and associated with the client device identifier by the online system 140. For example, the online system 140 identifies 315 a user based on information used by the online system to identify an online system user, such as, such as a phone number associated with the client device identifier and with the online system user, an e-mail address associated with the client device 110 and with the online system user, a user identifier associated with the online system user and with the client device identifier by the online system 140, or other suitable information.

The online system 140 generates 320 an application user ID associated with the identified user by encrypting, or by otherwise obfuscating, the information used by the online system 140 to identify the user. For example, online system 140 generates 320 an application user ID for a user by encrypting the user's online system user ID or information used by the online system 140 to identify the user. In various embodiments, the online system generates 320 an application user ID for a user by obfuscating or encrypting a portion of the information used by the online system 140 to identify the user. In one embodiment, the online system 140 generates 320 a new application user ID for each received request to create an application user ID, associating multiple application user IDs with a single user of the online system 140. Alternatively, each user of the online system 140 may be associated with a specific application user ID that is stored by the online system 140 and retrieved when the online system 140 receives a request to create an application user ID. If the client device 110 is not an application associated with the online system 140 (e.g., the application is not installed or the application is not currently executing), the online system 140 does not retrieve 310 a client device identifier, so the online system 140 does not generate 320 an application user ID.

After generating 320 the application user ID, the online system 140 sends 325 the application user ID to an advertiser 300 or to a developer associated with the third-party application executing on the client device 110 that requested 305 the application user ID. While FIG. 3 shows the online system 140 sending 325 the application user ID to the advertiser 300, in other embodiments the online system 140 sends the application user ID to the client device 110, and the application executing on the client device 110 communicates the application user ID to the advertiser 300. In one embodiment, the application user ID is communicated to the advertiser along with a client device identifier retrieved from the client device 110. Encrypting the information used by the online system 140 to identify the user protects the user's privacy by preventing the advertiser 300 from obtaining information personally identifying the user 410. However, if a user profile maintained by the online system 140 and associated with the user associated with the client device identifier specifies that the user has elected not to receive advertisements from advertisers or developers associated with third-party applications, the application user ID is not sent to the advertiser 300 to identify the online system user to the advertiser 300. For example, if a user 410 opts out of advertisement tracking by potential advertisers, when the online system 140 receives a request to create an application user ID, the online system 140 does not provide an application user ID to the entity requesting the application user ID.

Based on received application user IDs, the advertiser 300 selects 330 users of the online system 140 to be presented with an advertisement. For example, the advertiser 300 generates an ad request including an advertisement, a bid amount, and one or more application user IDs of online system users to be presented with the advertisement. The advertiser 300 sends 335 the ad request including one or more application user IDs to the online system 140 via the network 120. By including application user IDs in the ad request, the advertiser 300 describes a customized audience of online system users to be presented with one or more advertisements. Application user IDs included in an ad request identify a group of users the advertiser 300 has determined to be eligible to receive an advertisement specified by the ad request. For example, an ad request from a developer of a game application includes an advertisement for new features added in the past week and application user IDs of users associated with client device identifiers provided to the advertiser 300 by client devices previously used to play the game, but not within the past week. In various embodiments, the advertiser 300 sends 335 the ad request to the online system 140 through a file upload, through an advertisement API, or through any other suitable channel.

When the online system 140 identifies 340 an opportunity to present one or more advertisements to the user of the online system 140 associated with the client device identifier (e.g., in a newsfeed to be presented to the user), the online system 140 determines 345 whether to present the advertisement specified by the ad request received from the advertiser 300 based in part on whether the user corresponds to an application user ID included in the ad request. For example, the online system 140 decrypts the application user IDs included in the received ad request to identify online system users associated with the application user IDs and determines 345 whether the user corresponds to at least one application user ID included in the ad request.

Additional information may be used by the online system 140 when determining 345 whether to present the ad included in the ad request to a user. For example the online system determines 345 to present an advertisement to a user if the user is identified by an application user ID in an ad request and the ad request is also selected via an advertisement auction or ranking system (e.g., the ad request includes a bid amount having at least a threshold value). In a more specific example, if a newsfeed to be presented to a user includes five slots for presenting advertisements and the five advertisements having the highest ranking in an auction do not include the advertisement specified by the ad request specifying the application user ID corresponding to the user, the advertisements with the highest ranking in the auction are presented and the advertisement from the ad request is not presented. As another example, the online system 140 retrieves privacy settings associated with a user and determines 345 not to present an advertisement to the user if the advertisement does not satisfy at least one privacy setting of the user. If the online system 140 determines 345 that the advertisement included in the ad request is suitable for presentation to the user, the online system 140 sends 350 the advertisement to the client device 110 (e.g., a mobile device or a desktop device) for presentation to the user.

In some embodiments, rather than generate 320 an application user ID, the online system 140 stores client device identifiers received from an advertiser 300 or from a third-party application developer. Ad requests received by the online system 140 from the advertiser 300 or from the third-party developer include client device identifiers specifying online system users to be presented with an advertisement included in the ad request. When the online system 140 receives an ad request from the advertiser 300 including client device identifiers, the online system 140 identifies the users being targeted by retrieving user-identifying information associated with the client device 110 by the online system 140. As described above, the online system 140 determines 345 whether to serve the advertisement to users based in part on whether users identified by the client device identifiers referenced in the ad request.

SUMMARY

The foregoing description of the embodiments have been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
    receiving, by an online system, a request for an application user identifier (ID) from an application executing on a client device, wherein the application user ID is an identifier of the application and specific to a user of the client device;
    retrieving, by the online system, a unique identifier of the client device;
    based on the unique identifier of the client device, retrieving, by the online system, information identifying the user, the information maintained by the online system, wherein the client device is separate and distinct from the online system;
    generating, by the online system, the application user ID by encrypting the information identifying the user;
    sending, by the online system, the application user ID to an advertiser associated with the application, wherein the advertiser is separate and distinct from the client device and the online system;
    receiving, from the advertiser, an ad request including an advertisement and the application user ID;
    determining, by the online system, the application user ID included in the ad request corresponds to the user via decrypting the application user ID included in the ad request;
    identifying, by the online system, an opportunity to present one or more advertisements to the user via the client device; and
    responsive to determining that the application user ID included in the ad request corresponds to the user, sending, by the online system, the advertisement included in the received ad request to the client device for presentation to the user.

2. The method of claim 1, further comprising:
    storing the application user ID associated with the user.

3. The method of claim 1, wherein the information identifying the user comprises information identifying the client device.

4. The method of claim 1, wherein retrieving, by an online system, information identifying the user of the client device comprises:
    comparing information describing an identity of the user included in the request to information stored by the online system; and
    retrieving information associated with information stored by the online system that matches the information describing the identity of the user included in the request.

5. The method of claim 1, wherein the information identifying the user is selected from a group consisting of: a user identifier associated with the user by the online system, a phone number associated with the user, an e-mail address associated with the user, and any combination thereof.

6. The method of claim 1, wherein generating, by the online system, the application user ID comprises:
    retrieving one or more privacy settings associated with the information identifying the user; and
    generating the application user ID by encrypting the information identifying the user if a privacy setting associated with the information identifying the user authorizes the generation.

7. The method of claim 1, wherein sending, by the online system, the advertisement included in the received ad request to the client device for presentation to the user comprises:
    ranking a plurality of advertisements, including the advertisement included in the ad request, for presentation to the user based at least in part on bid amounts associated with each of the advertisements; and
    selecting the advertisement included in the ad request for sending to the client device based at least in part on the ranking.

8. A computer program product comprising a non-transitory computer-readable storage medium containing computer program code that, when executed by one or more processors, cause the one or more processors to perform a method comprising:
    receiving, by an online system, a request for an application user identifier (ID) from an application executing on a client device, wherein the application user ID is an identifier of the application and specific to a user of the client device;

retrieving, by the online system, a unique identifier of the client device;

based on the unique identifier of the client device, retrieving, by the online system, information identifying the user, the information maintained by the online system, wherein the client device is separate and distinct from the online system;

generating, by the online system, the application user ID by encrypting the information identifying the user;

sending, by the online system, the application user ID to an advertiser associated with the application executing on the client device, wherein the advertiser is separate and distinct from the client device and the online system;

receiving, from the advertiser, an ad request including an advertisement and the application user ID;

determining, by the online system, the application user ID included in the ad request corresponds to the user via decrypting the application user ID included in the ad request;

identifying, by the online system, an opportunity to present one or more advertisements to the user via the client device; and responsive to determining that the application user ID included in the ad request corresponds to the user, sending, by the online system, the advertisement included in the received ad request to the client device for presentation to the user.

9. The computer program product of claim 8, further comprising:

responsive to determining that the application user ID included in the ad request corresponds to the user, providing for presentation on the client device associated with the user, by the online system, the advertisement included in the ad request.

10. The computer program product of claim 8, wherein the information identifying the user comprises information identifying the client device.

11. The computer program product of claim 8, wherein information used by the online system to identify the user is selected from a group consisting of: a user identifier associated with the user by the online system, a phone number associated with the user, an e-mail address associated with the user, and any combination thereof.

12. The computer program product of claim 8, further comprising:

storing the generated application user ID.

13. The computer program product of claim 8, wherein generating, by the online system, application user ID comprises:

storing the information identifying the user; and storing an association between the information identifying the user and the user of the online system.

14. The computer program product of claim 8, wherein generating, by the online system, the application user ID comprises:

retrieving one or more privacy settings associated with the user by the online system; and generating the application user ID if a privacy setting associated with the information identifying the user authorizes the generation.

15. The computer program product of claim 8, wherein determining the application user ID included in the ad request corresponds to the user is further based at least in part on one or more privacy settings associated with the user by the online system.

16. A system comprising:

a processor; and a computer-readable storage medium coupled to the processor, the computer-readable storage medium having instructions encoded thereon that, when executed by the processor, cause the processor to:

receive, by an online system, a request for an application user identifier (ID) from an application executing on a client device, wherein the application user ID is an identifier of the application and specific to a user of the client device;

retrieve, by the online system, a unique identifier of the client device;

based on the unique identifier of the client device, receive information describing an identity of the user of the online system wherein the client device is separate and distinct from the online system;

generate, by the online system, the application user ID by encrypting the information describing the identity of the user;

send the application user ID to an advertiser associated with the application wherein the advertising system is separate and distinct from client device and the online system;

receive, from the advertiser, an ad request including an advertisement and the application user ID;

determine, by the online system, the application user ID included in the ad request corresponds to the user via decrypting the application user ID included in the ad request;

identify, by the online system, an opportunity to present one or more advertisements to the user via the client device; and responsive to determining that the application user ID included in the ad request corresponds to the user via decrypting the application user ID, send, by the online system, the advertisement included in the received ad request to the client device for presentation to the user.

* * * * *

UNITED STATES PATENT AND TRADEMARK OFFICE
CERTIFICATE OF CORRECTION

PATENT NO. : 9,767,487 B2  
APPLICATION NO. : 14/034350  
DATED : September 19, 2017  
INVENTOR(S) : Greg Schechter et al.

Page 1 of 1

It is certified that error appears in the above-identified patent and that said Letters Patent is hereby corrected as shown below:

Column 14, Line 36, after "from," insert -- the --.

Signed and Sealed this  
Twenty-second Day of May, 2018

Andrei Iancu  
*Director of the United States Patent and Trademark Office*